United States Patent
Jung (10) Patent No.: US 10,431,234 B2
(45) Date of Patent: Oct. 1, 2019

(54) DEVICE AND METHOD FOR TRANSMITTING AND RECEIVING VOICE DATA IN WIRELESS COMMUNICATION SYSTEM

(71) Applicant: SAMSUNG ELECTRONICS CO., LTD., Suwon-si (KR)

(72) Inventor: Kyung-hun Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/305,944

(22) PCT Filed: Jun. 22, 2015

(86) PCT No.: PCT/KR2015/006330
§ 371 (c)(1),
(2) Date: Mar. 20, 2017

(87) PCT Pub. No.: WO2015/163750
PCT Pub. Date: Oct. 29, 2015

(65) Prior Publication Data
US 2017/0330576 A1 Nov. 16, 2017

(30) Foreign Application Priority Data

Nov. 5, 2014 (KR) .......................... 10-2014-0153191

(51) Int. Cl.
*G10L 19/24* (2013.01)
*H04L 29/06* (2006.01)
(Continued)

(52) U.S. Cl.
CPC ............ *G10L 19/24* (2013.01); *G10L 19/002* (2013.01); *G10L 19/0019* (2013.01);
(Continued)

(58) Field of Classification Search
None
See application file for complete search history.

(56) References Cited

U.S. PATENT DOCUMENTS 6,384,759 B2 * 5/2002 Snyder ................ G10L 19/0212
341/123
6,424,636 B1 * 7/2002 Seazholtz ............ H04M 11/062
370/295
(Continued)

FOREIGN PATENT DOCUMENTS

JP 2004309686 A 11/2004
JP 2008139781 A 6/2008
(Continued)

OTHER PUBLICATIONS

International Search Report and Written Opinion (PCT/ISA/210 & PCT/ISA/237) dated Oct. 27, 2015, issued by the International Search Authority in counterpart International Application No. PCT/KR2015/006330.
(Continued)

*Primary Examiner* — Neeraj Sharma
(74) *Attorney, Agent, or Firm* — Sughrue Mion, PLLC (57) ABSTRACT

Provided are a device and a method for transmitting and receiving voice data in a wireless communication system. A method for operating a transmission terminal for transmitting a voice signal comprises the steps of: generating sampling and bitrate request information including sampling information for determining a sampling rate of the voice signal and bitrate information for determining a bitrate of the voice signal, and transmitting the generated sampling and bitrate request information to a reception terminal; receiving, from the reception terminal, combined determination information obtained by at least one combination of the sampling rate determined on the basis of the sampling information and the bitrate determined on the basis of the (Continued)

bitrate information; and compressing the voice signal according to the received combined determination information, and transmitting the compressed voice signal to the reception terminal.

10 Claims, 9 Drawing Sheets

(51) Int. Cl.
*G10L 19/00* (2013.01)
*G10L 19/002* (2013.01)
*H04L 12/811* (2013.01)
*H04L 1/00* (2006.01)
*G10L 19/22* (2013.01)
*H04L 5/00* (2006.01)

(52) U.S. Cl.
CPC ............ *G10L 19/22* (2013.01); *H04L 1/0014* (2013.01); *H04L 29/06* (2013.01); *H04L 47/38* (2013.01); *H04L 65/601* (2013.01); *H04L 65/80* (2013.01); *H04L 5/0092* (2013.01); *H04L 65/608* (2013.01); *H04L 69/04* (2013.01)

(56) References Cited

U.S. PATENT DOCUMENTS

| | | | | |
|---|---|---|---|---|
| 6,944,221 B1* | 9/2005 | Keesman | ......... | H04N 21/23406 375/240.02 |
| 8,315,861 B2 | 11/2012 | Miseki | | |
| 2002/0172193 A1* | 11/2002 | Preston | ................. | G01S 5/0027 370/352 |
| 2006/0262831 A1* | 11/2006 | Kline | .................... | H04B 1/715 375/136 |
| 2007/0277078 A1* | 11/2007 | Yamanashi | ........... | G10L 19/005 341/94 |
| 2008/0232456 A1 | 9/2008 | Terashima et al. | | |
| 2009/0180518 A1* | 7/2009 | Ishii | ..................... | H04B 1/7172 375/130 |
| 2009/0234645 A1* | 9/2009 | Bruhn | .................... | G10L 19/022 704/205 |
| 2012/0185600 A1 | 7/2012 | Belling et al. | | |
| 2012/0250762 A1* | 10/2012 | Kaye | ....................... | H04L 47/25 375/240.07 |
| 2012/0323583 A1* | 12/2012 | Miyasaka | ............. | H04M 9/082 704/500 |
| 2013/0132099 A1 | 5/2013 | Oshikiri et al. | | |
| 2013/0230176 A1* | 9/2013 | Virette | .................. | G10L 19/008 381/22 |
| 2014/0105041 A1 | 4/2014 | Swaminathan et al. | | |
| 2014/0330415 A1* | 11/2014 | Ramo | ..................... | G10L 19/06 700/94 |
| 2015/0127775 A1* | 5/2015 | Munagala | ............. | H04L 65/601 709/219 |
| 2015/0149121 A1* | 5/2015 | Ahmed | ..................... | G06F 3/06 702/190 |

FOREIGN PATENT DOCUMENTS

| | | |
|---|---|---|
| JP | 2008233436 A | 10/2008 |
| WO | 2008108379 A1 | 9/2008 |
| WO | 2010/117326 A1 | 10/2010 |

OTHER PUBLICATIONS

Jeremy Colandairaj et al., "A Co-Design Solution for Wireless Feedback Control", Proceedings of the 2007 IEEE International Conference on Networking, Sensing and Control, London, UK, Apr. 15, 2007-Apr. 17, 2007, pp. 404-409, XP031178344, (6 pages total).
Nokia et al., "AMR-WB extension for high audio quality", TSG-SA WG4#24 meeting, Nov. 11, 2002-Nov. 15, 2002, Redmond, USA, SA4-020658, pp. 1-5, XP050637712, (5 pages total).
Communication dated Oct. 23, 2017 by the European Patent Office in counterpart European Patent Application No. 15783098.5.

* cited by examiner

SDP offer (TRANSMISSION TERMINAL A)

m=audio 1230 RTP/AVP 98 99 100
b=AS:160
b=RS:0
b=RR:2000
a=rtpmap: 98 EVS/48000/1
a=rtpmap:99 AMR-WB/16000/1
a=rtpmap:100 AMR/8000/1
a=ptime:20
a=maxptime:240
a=sendrecv

FIG. 4B

SDP answer (RECEPTION TERMINAL B)

m=audio 1230 RTP/AVP 98
b=AS:42
b=RS:0
b=RR:2000
a=rtpmap: 98 EVS/32000/1
a=fmtp:98 config-set={(0,0),(1,1),(1,2),(2,3),(2,4),(2,5)}

FIG. 5A

VOICE SIGNAL BASED ON LOW-FREQUENCY BAND

FIG. 5B

VOICE SIGNAL BASED ON HIGH-FREQUENCY BAND

| SDP offer (TRANSMISSION TERMINAL A) | SDP answer (RECEPTION TERMINAL B) |
|---|---|
| m=audio 1230 RTP/AVP 98 99 100<br>b=AS:81<br>b=RS:0<br>b=RR:2000<br>a=rtpmap:98 EVS/48000/1<br>a=fmtp:98 br=5.9-64<br>a=rtpmap:99 AMR/16000/1<br>a=rtpmap:100 AMR/8000/1<br>a=ptime:20<br>a=maxptime:240<br>a=sendrecv | m=audio 1230 RTP/AVP 98<br>b=AS:42<br>b=RS:0<br>b=RR:2000<br>a=rtpmap:98 EVS/48000/1<br>a=fmtp:98 br=13.2-24.4<br>a=ptime:20<br>a=maxptime:240<br>a=sendrecv |

FIG. 12

| SDP offer (TRANSMISSION TERMINAL A) | SDP answer (RECEPTION TERMINAL B) |
|---|---|
| m=audio 1230 RTP/AVP 98 99 100<br>b=AS:145<br>b=RS:0<br>b=RR:2000<br>a=rtpmap:98 EVS/48000/1<br>a=fmtp:98 bw=nb-swb<br>a=rtpmap:99 AMR-WB/16000/1<br>a=rtpmap:100 AMR/8000/1<br>a=ptime:20<br>a=maxptime:240<br>a=sendrecv | m=audio 1230 RTP/AVP 98<br>b=AS:145<br>b=RS:0<br>b=RR:2000<br>a=rtpmap:98 EVS/48000/1<br>a=fmtp:98 bw=nb-wb<br>a=ptime:20<br>a=maxptime:240<br>a=sendrecv |

FIG. 13

| SDP offer (TRANSMISSION TERMINAL A) | SDP answer (RECEPTION TERMINAL B) |
|---|---|
| m=audio 1230 RTP/AVP 98 99 100<br>b=AS:145<br>b=RS:0<br>b=RR:2000<br>a=rtpmap:98 EVS/48000/1<br>a=fmtp:98 br=5.9-64;bw=nb-swb<br>a=rtpmap:99 AMR-WB/16000/1<br>a=rtpmap:100 AMR/8000/1<br>a=ptime:20<br>a=maxptime:240<br>a=sendrecv | m=audio 1230 RTP/AVP 98<br>b=AS:42<br>b=RS:0<br>b=RR:2000<br>a=rtpmap:99 EVS/48000/1<br>a=fmtp:98 br=13.2-24.4;bw=nb-wb<br>a=ptime:20<br>a=maxptime:240<br>a=sendrecv |

FIG. 14

| SDP offer (TRANSMISSION TERMINAL A) | SDP answer (RECEPTION TERMINAL B) |
|---|---|
| m=audio 1230 RTP/AVP 98 99 100<br>b=AS:42<br>b=RS:0<br>b=RR:2000<br>a=rtpmap:98 EVS/48000/1<br>a=fmtp:98 br=5.9-24.4;bw=nb-swb<br>a=rtpmap:99 AMR-WB/16000/1<br>a=rtpmap:100 AMR/8000/1<br>a=ptime:20<br>a=maxptime:240<br>a=sendrecv | m=audio 1230 RTP/AVP 98<br>b=AS:30<br>b=RS:0<br>b=RR:2000<br>a=rtpmap:98 EVS/48000/1<br>a=fmtp:98 br-recv=13.2; br-send=5.9-24.4; bw-recv=nb-wb; bw-send=nb-swb<br>a=ptime:20<br>a=maxptime:240<br>a=sendrecv |

DEVICE AND METHOD FOR TRANSMITTING AND RECEIVING VOICE DATA IN WIRELESS COMMUNICATION SYSTEM

TECHNICAL FIELD

Exemplary embodiments relate to an apparatus and method for transmitting and receiving voice data in a wireless communication system

BACKGROUND ART

A speech is compressed by a speech codec (encoder) of a transmission terminal, various types of headers such as real-time transport protocol (RTP), user datagram protocol (UDP), and Internet protocol (IP) headers are attached to the compressed speech, and the header-attached compressed speech is transmitted through a communication modem such as a long-term evolution (LTE) modem. A reception terminal sequentially removes the RTP, UDP, and IP headers and checks whether there is a lost speech frame. A speech frame restored without any loss is decompressed by a speech codec (decoder) from a compressed state, converted into a pulse coded modulation (PCM) signal, and delivered to a speaker.

When a loss in information is discovered during the restoration of speech frames, error concealment for reducing damages in sound quality is carried out by using information about previous frames. If a call is not smooth because speech frames were lost during transmission due to congestion of a transmission path, a speech bit-rate may be adjusted by transmitting a codec mode request (CMR) message to a counterpart terminal such that the bit-rate is temporarily decreased when there is a congestion status and is gradually increased as the congestion status is solved.

According to conventional voice compression techniques such as adaptive multi-rate (AMR) and adaptive multi-rate wideband (AMR-WB) techniques, a voice bandwidth is fixed to a narrowband or a wideband, this indicates that an analog voice signal is converted into a digital signal at 8,000 or 16,000 samples/s and compressed, and this conversion speed does not change during a call. An AMR codec may compress a voice signal digitized at 8,000 samples/s to eight types of bit-rates of 4.75 to 12.2 Kbps and process a voice signal of a band of 300 to 3,400 Hz. An AMR-WB codec may compress a voice signal digitized at 16,000 samples/s to nine types of bit-rates of 6.6 to 23.85 Kbps and process a voice signal of a band of 50 to 7,000 Hz.

Recently, with respect to call quality of AMR-WB voice codecs commercialized in a voice over LTE (VoLTE) service, most listeners think that call quality is improved, but some listeners do not prefer call quality of a high-frequency voice and tend to think that the quality of a conventional AMR voice codec was better. This indicates that a high-frequency voice component may or may not be preferred according to a listener or background noise compressed along with a voice.

DETAILED DESCRIPTION OF THE INVENTION

Technical Problem

Provided are an operating method and apparatus of a transmission terminal and a reception terminal for transmitting/receiving a voice signal of which a sampling rate and/or a bit-rate are mutually adjusted between terminals during a call in consideration of the fact that optimal call quality can be achieved by using another sampling rate according to circumstances even at the same voice bit-rate.

Provided are a method and apparatus for efficiently negotiating, between two terminals, a bit-rate and/or a sampling rate of a voice codec supporting bit-rates of a wider range than the prior art and sampling rates of a wider range than the prior art.

Technical Solution

According to an aspect of an exemplary embodiment, an operating method of a transmission terminal for transmitting a voice signal includes: generating sampling- and bit-rate request information including sampling information for determining a sampling rate of a voice signal and bit-rate information for determining a bit-rate of the voice signal and transmitting the generated sampling- and bit-rate request information to a reception terminal; receiving, from the reception terminal, combination determination information by at least one combination of sampling rates determined based on the sampling information and bit-rates determined based on the bit-rate information; and compressing the voice signal according to the received combination determination information and transmitting the compressed voice signal to the reception terminal.

According to an aspect of another exemplary embodiment, an operating apparatus of a transmission terminal for transmitting a voice signal includes: a request information generation unit configured to generate sampling- and bit-rate request information including sampling information for determining a sampling rate of a voice signal and bit-rate information for determining a bit-rate of the voice signal; a control unit configured to control the generated sampling- and bit-rate request information to be transmitted to a reception terminal; an interface unit configured to transmit the sampling- and bit-rate request information to the reception terminal under control of the control unit; and a voice compression unit configured to, if the interface unit receives, from the reception terminal, combination determination information by at least one combination of sampling rates determined based on the sampling information and bit-rates determined based on the bit-rate information, compress the voice signal according to the received combination determination information, wherein the interface unit transmits the compressed voice signal to the reception terminal under control of the control unit.

According to an aspect of another exemplary embodiment, an operating method of a reception terminal for receiving a voice signal includes: receiving, from a transmission terminal, sampling- and bit-rate request information including sampling information for determining a sampling rate of a voice signal and bit-rate information for determining a bit-rate of the voice signal; determining at least one combination of sampling rates determined based on the sampling information and bit-rates determined based on the bit-rate information, according to the sampling- and bit-rate request information; and transmitting the determined combination determination information to the transmission terminal.

According to an aspect of another embodiment, an operating apparatus of a reception terminal for receiving a voice signal includes: an interface unit configured to receive, from a transmission terminal, sampling- and bit-rate request information including sampling information for determining a sampling rate of a voice signal and bit-rate information for determining a bit-rate of the voice signal; a combination determination unit configured to determine at least one combination of sampling rates determined based on the sampling information and bit-rates determined based on the bit-rate information, according to the sampling- and bit-rate request information; and a control unit configured to control the determined combination determination information to be transmitted to the transmission terminal, wherein the interface unit transmits the combination determination information to the transmission terminal under control of the control unit.

Advantageous Effects of the Invention

According to exemplary embodiments, in a voice over Internet protocol (VoIP) system using a voice codec such as enhanced voice services (EVS) capable of compressing a voice at a plurality of sampling rates and bit-rates, a sampling rate and a bit-rate to be used for a service in the voice codec supporting the plurality of sampling rates and bit-rates may be appropriately negotiated, and a compression scheme of a counterpart terminal may be dynamically adjusted according to a taste of a recipient, voice content, and background noise.

MODE OF THE INVENTION

FIGS. 1 to 14 are only illustrative and thus should not be analyzed as being limitations of the scope of the invention. It will be understood by those of ordinary skill in the art that the present disclosure could be implemented even in a random communication system including appropriate operational principles related to embodiments.

Figure 1:
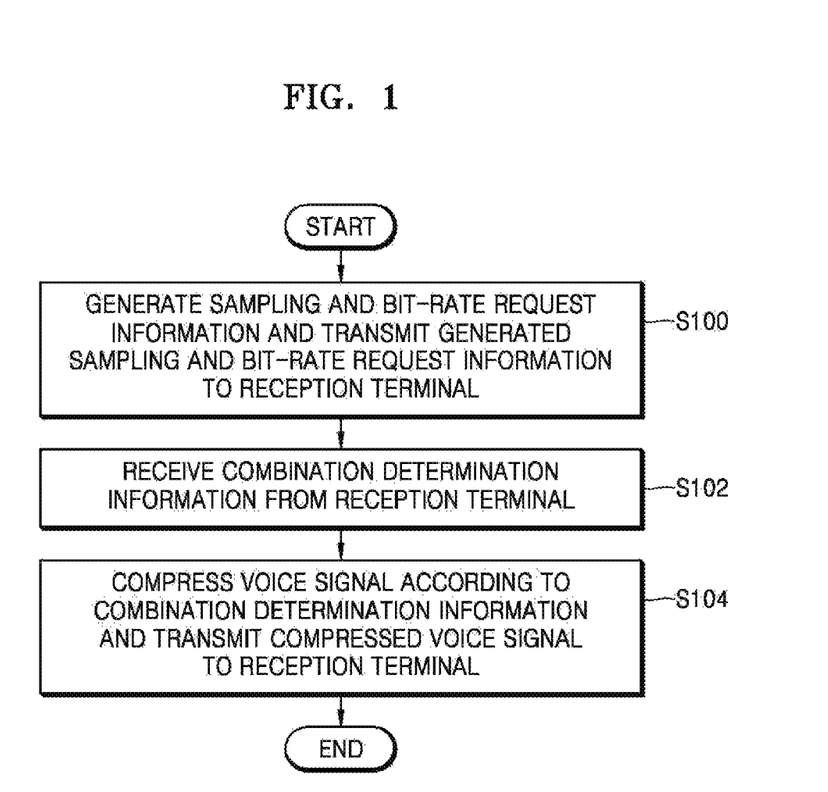
FIG. 1 is a flowchart of an operating method of a transmission terminal for transmitting a voice signal, according to an exemplary embodiment.

FIG. 1 is a flowchart of an operating method of a transmission terminal for transmitting a voice signal, according to an exemplary embodiment.

Referring to FIG. 1, in operation S100, the transmission terminal may generate sampling- and bit-rate request information including sampling information for determining a sampling rate and bit-rate information for determining a bit-rate of a voice signal and transmit the generated sampling- and bit-rate request information to a reception terminal. The sampling information may include sampling list information having at least one sampling type or sampling rate range information determined with respect to a specific range, and the bit-rate information may include bit-rate list information having at least one bit-rate type or bit-rate range information determined with respect to a specific range.

In general, examples of types of voice codecs according to bands are as shown in Table 1.

TABLE 1

| Codec Type | Source Bandwidth (Hz) | Sampling Rate (samples/s) | Bit-rate (Kbps) |
| --- | --- | --- | --- |
| Narrow Band (NB) | 100~3,500 | 8,000 | 5.9, 7.2, 8, 9.6, 13.2, 16.4, 24.4, 32, 48, 64, 96, 128 |
| Wide Band (WB) | 50~7,000 | 16,000 | |
| Super Wide Band (SWB) | 50~16,000 | 32,000 | |
| Full Band (FB) | 50~20,000 | 48,000 | |

According to Table 1, a voice codec of the NB corresponding to 100 to 3,500 Hz has a sampling rate of 8,000 samples/s and selectively uses, as a bit-rate, one of 7.2, 8, 9.6, 13.2, 16.4, 24.4, 32, 48, 64, 96, and 128. In addition, a voice codec of the WB corresponding to 50 to 7,000 Hz has a sampling rate of 16,000 samples/s and selectively uses one of the 11 bit-rates described above. In addition, a voice codec of the SWB corresponding to 50 to 16,000 Hz has a sampling rate of 32,000 samples/s and selectively uses one of the 11 bit-rates described above. In addition, a voice codec of the FB corresponding to 50 to 20,000 Hz has a sampling rate of 48,000 samples/s and selectively uses one of the 11 bit-rates described above. That is, the voice codecs according to bands selectively use various bit-rates but respectively use fixed sampling rates. Compared with this, the exemplary embodiment allows not only bit-rates but also sampling rates to be selectively used according to types of voice codecs as described below.

According to the voice compression techniques, the number of bit-rates usable during a call is 8, 9, or less, and a difference between a minimum value and a maximum value is not that large as 10-20 Kbps or less. For example, 8 bit-rates between 4.75 Kbps and 12.2 Kbps may be used in the AMR technique, and 9 bit-rates between 6.6 Kbps and 23.85 Kbps may be used in the AMR-WB technique.

According to an exemplary embodiment, the transmission terminal may generate list information of, for example, 8,000, 16,000, 32,000, and 48,000 samples/s corresponding to types of sampling rates as sampling list information corresponding to sampling and/or bit-rate request information. In addition, the transmission terminal may generate list information of, for example, 7.2, 8, 9.6, 13.2, 16.4, 24.4, 32, 48, 64, 96, and 128 as bit-rate list information.

The sampling list information included in the sampling- and bit-rate request information may include sampling identification information corresponding to each of sampling types, and the bit-rate list information may include bit-rate identification information corresponding to each bit-rate type.

Table 2 illustrates identification information according to sampling rates.

TABLE 2

| Sampling Rate (samples/s) | | | |
|---|---|---|---|
| 8,000 | 16,000 | 32,000 | 48,000 |
| Id 0 | 1 | 2 | 3 |

According to Table 2, identification information Id is allocated to each of sampling rates.

Table 3 illustrates identification information according to bit-rates.

TABLE 3

| Bit-rate (Kbps) | | | | | | | | | | |
|---|---|---|---|---|---|---|---|---|---|---|
| 7.2 | 8 | 9.6 | 13.2 | 16.4 | 24.4 | 32 | 48 | 64 | 96 | 128 |
| Id 0 | 1 | 2 | 3 | 4 | 5 | 6 | 7 | 8 | 9 | 10 |

According to Table 3, identification information Id is allocated to each bit-rate.

The transmission terminal may insert the generated sampling- and bit-rate request information into a payload header. That is, the sampling list information and the bit-rate list information corresponding to the sampling- and bit-rate request information may be added to the payload header.

The payload header includes, together with the sampling list information and the bit-rate list information, sampling type confirmation information of a sampling type being currently used, bit-rate type confirmation information of a bit-rate type being currently used, and the like.

Figure 2:
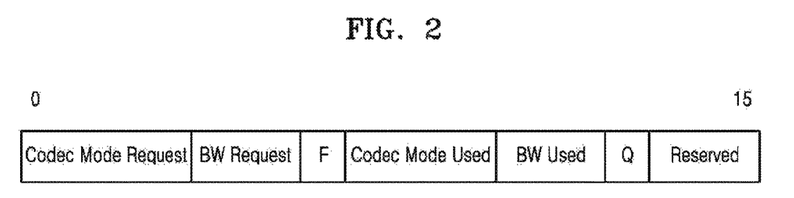
FIG. 2 is a reference diagram showing an example of a payload header.

FIG. 2 is a reference diagram showing an example of a payload header. In FIG. 2, "Codec Mode Request" indicates bit-rate list information, "BW Request" indicates sampling list information, "Codec Mode Used" indicates bit-rate type confirmation information of a bit-rate type being currently used, and "BW Used" indicates sampling type confirmation information of a sampling type being currently used. In addition, "F" indicates information indicating whether a voice frame is continuously transmitted, and "0" indicates information indicating whether there is an error in a voice frame.

A function of each field of the payload header of FIG. 2 may be illustrated as Table 4 below. As in an enhanced voice service (EVS) for multiple bit-rates/multiple bandwidths, a payload header of a voice codec includes 2 bytes, and a function and a length of each field are as follows.

TABLE 4

| Each Field | Length (Bits) | Function |
|---|---|---|
| Codec Mode Request | 4 | bit-rate requested to counterpart terminal, 0-10 can be assigned with 0000-1010: 7.2 (0), 8 (1), 9.6 (2), 13.2 (3), 16.4 (4), 24.4 (5), 32 (6), 48 (7), 64 (8), 96 (9), 128 (10) |
| BW Request | 2 | bandwidth requested to counterpart terminal: 00 (NB, 8000 samples/s), 01 (WB, 16000 samples/s), 10 (SWB, 32000 samples/s), 11 (FB, 48000 samples/s) |
| F | 1 | F = 1: voice frame is carried after corresponding frame, F = 0: corresponding frame is last voice frame |
| Codec Mode Used | 4 | bit-rate used for current frame, 0-10 can be assigned with 0000-1010: 7.2 (0), 8 (1), 9.6 (2), 13.2 (3), 16.4 (4), 24.4 (5), 32 (6), 48 (7), 64 (8), 96 (9), 128 (10) |
| BW Used | 2 | bandwidth used for current frame: 00 (NB, 8000 samples/s), 01 (WB, 16000 samples/s), 10 (SWB, 32000 samples/s), 11 (FB, 48000 samples/s) |
| Q | 1 | F = 0: corresponding frame includes error, F = 0: corresponding frame includes no error |
| Reserved | 2 | Not used |

That is, as the bit-rate list information, list information of bit-rate types, for example, 7.2, 8, 9.6, 13.2, 16.4, 24.4, 32, 48, 64, 96, and 128 and respective pieces of identification information 0000 to 1010 corresponding to the list information are included. In addition, as the sampling rate list information, list information of, for example, 8,000, 16,000, 32,000, and 48,000 and respective pieces of identification information 00 to 11 corresponding to the list information are included. In addition, as the bit-rate type confirmation information, list information of a bit-rate used for a current frame and identification information corresponding to the list information are included. In addition, as the sampling type confirmation information, information about a sampling rate used for the current frame and identification information corresponding to the information are included.

The transmission terminal may generate a voice over Internet protocol (VoIP) packet in which a real-time transport protocol (RTP) header, a user datagram protocol (UDP) header, and an Internet protocol (IP) header are sequentially added in addition to a payload header having the sampling- and bit-rate request information, and transmit the generated VoIP packet to the reception terminal.

Figure 3:
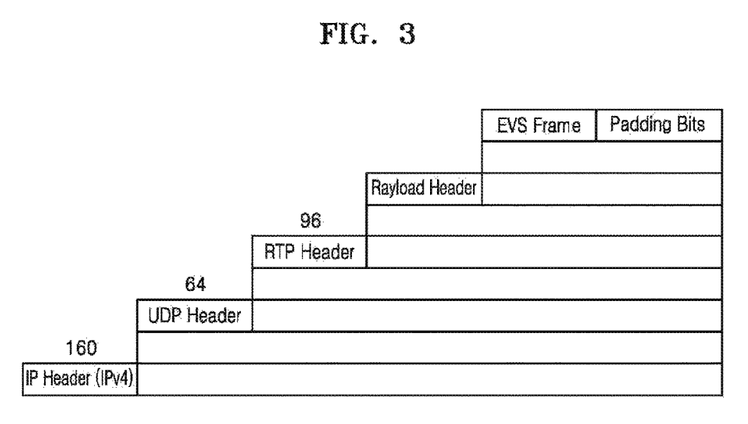
FIG. 3 is a reference diagram showing an example of a VoIP packet including a payload header.

FIG. 3 is a reference diagram showing an example of a VoIP packet including a payload header. A payload header is added to a voice frame, wherein "0" may be padded to adjust a payload length in a byte unit. As described above, sampling rate list information and bit-rate list information are included in the payload header, and sampling rate information and bit-rate information being currently used may be included. In this case, a sum of the payload header, an EVS frame, and padding bits is named an RTP payload. A VoIP packet having an RTP header, a UDP header, and an IP header in addition to the RTP payload may be transmitted to a counterpart terminal through a modem.

Referring back to FIG. 1, after operation S100, in operation S102, the transmission terminal may receive, from the reception terminal, combination determination information by at least one combination of sampling rates determined based on the sampling information and bit-rates determined based on the bit-rate information. The combination determination information may be determined by at least one combination of sampling types selected from the sampling information and bit-rate types selected from the bit-rate information or by at least one combination of a range of sampling rates determined within the range of the sampling rate range information and a range of bit-rates determined within the range of the bit-rate range information. The sampling rate range information may be differently determined in a sending direction and a receiving direction, and the bit-rate range information may be differently determined in the sending direction and the receiving direction.

Figure 4A:
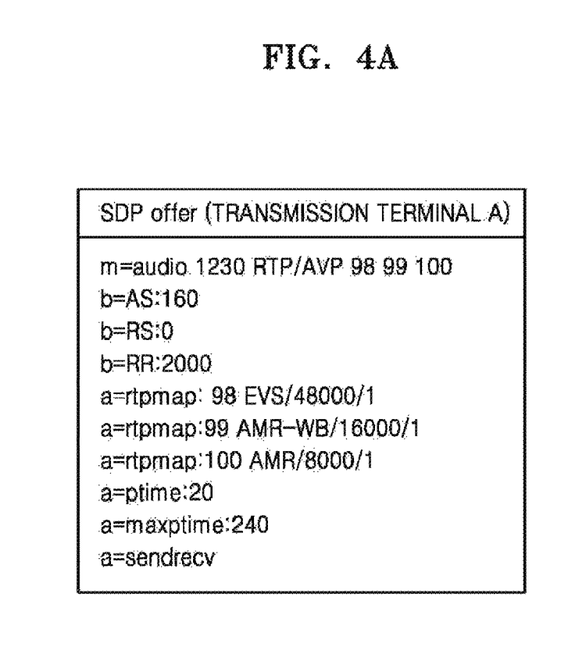
FIGS. 4A and 4B are reference diagrams showing an example of information transmitted from a transmission terminal to a reception terminal and information transmitted from the reception terminal to the transmission terminal.

FIG. 4 is a reference diagram showing an example of information transmitted from a transmission terminal to a reception terminal and information transmitted from the reception terminal to the transmission terminal. FIG. 4(a) shows information for informing the reception terminal that the transmission terminal can use three types of voice codes of EVS, AMR-WB, and AMR for voice communication. The information indicates that EVS supports up to the FB (48,000 samples/s), AMR-WB supports 16,000 samples/s, and AMR supports 8,000 samples/s. That is, EVS/48000, AMR-WB/16000, and AMR/8000 indicate list information of sampling rate types which can be combined by the reception terminal. In addition, b=AS:160 indicates an application-specific maximum bit-rate and has an integer value obtained by adding an RTP/UDP/IP header to a maximum voice bit-rate. That is, b=AS:160 indicates a value obtained by adding 32 (the RTP/UDP/IP header) to 128 Kbps of EVS. Therefore, the application-specific maximum bit-rate is a maximum value of bit-rates and indicates list information of bit-rate types which can be combined by the reception terminal.

Figure 4B:
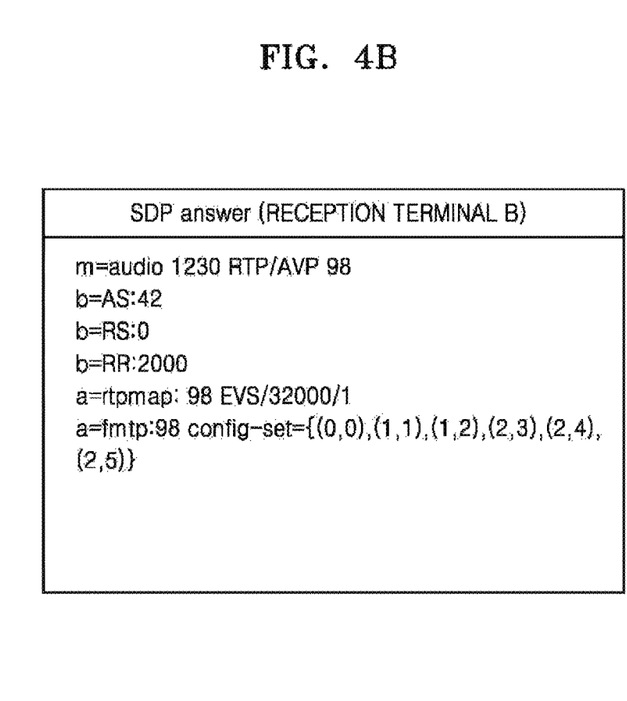

When receiving sampling- and bit-rate list information including sampling rate list information and bit-rate list information from the transmission terminal, the reception terminal selects EVS from the sampling rate list information and determines any one sampling rate (for example, 32,000 samples/s) as shown in FIG. 4(b). In addition, the reception terminal determines that a bit-rate of maximum 24.4 Kbps from the bit-rate list information is used. That is, config-set indicates combination determination information which is to be transmitted to the transmission terminal as {(0, 0), (1, 1), (1, 2), (2, 3), (2, 4), (2, 5)}. Each piece of the combination determination information indicates (sampling rate identification information, bit-rate identification information). That is, (0, 0) is a combination of sampling rate identification information "0" and bit-rate identification information "0", wherein a sampling rate type corresponding to the identification information corresponds to 8,000 (NB), and a bit-rate type corresponding to the identification information corresponds to 7.2. Therefore, {(0, 0), (1, 1), (1, 2), (2, 3), (2, 4), (2, 5)} as the combination determination information respectively indicate combination information of sampling rate types and bit-rate types of 7.2 (NB), 8 (WB), 9.6 (WB), 13.2 (SWB), 16.4 (SWB), and 24.4 (SWB).

This combination determination information corresponds to combination information of sampling rate types and bit-rate types determined by using at least one of background noise, audio quality, audio tone of an audio signal including the voice signal.

Figure 5A:
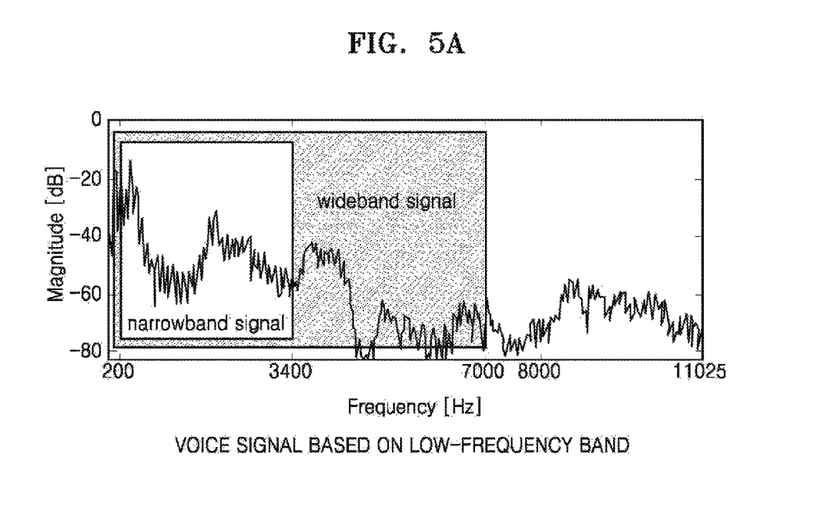
FIGS. 5A and 5B are reference diagrams for describing a reception terminal determining combination determination information.
Figure 5B:
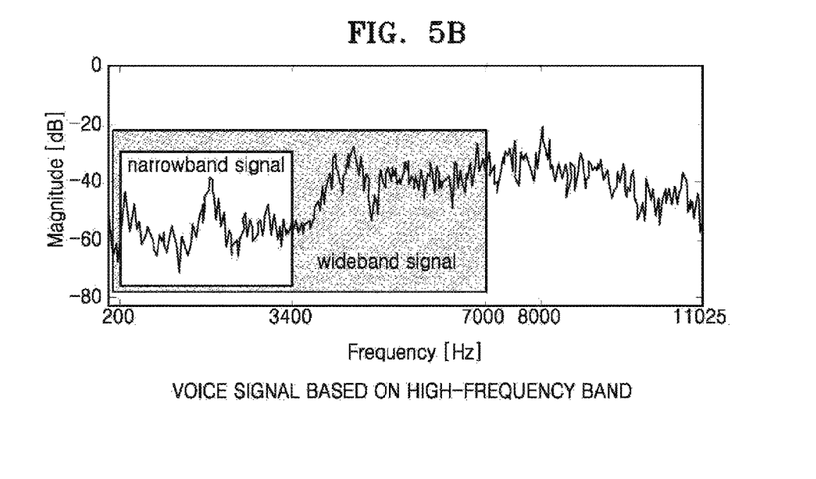

FIG. 5 is an illustrative reference diagram for describing a reception terminal determining combination determination information. FIG. 5(a) illustrates a voice signal based on a low-frequency band, and FIG. 5(b) illustrates a voice signal based on a high-frequency band. For example, a user of the reception terminal for receiving a voice signal may not want to hear high-frequency audio or a sharp sound. In this case, the reception terminal may analyze received voice frames and determine information, i.e., combination determination information, for making a counterpart terminal decrease a sampling rate from the super wideband (SWB) to the wideband (WB) or narrowband (NB) when an energy ratio of high-frequency components higher than a specific frequency or higher is a specific level or higher as shown in FIG. 5(b). This situation may occur in the inside of a factory in which metallic noise is generated or in a case of talking to a person having a high tone. On the contrary, in a situation of being connected to a security camera or the like such that it is necessary to transmit even a change in a fine sound, it may be adjusted so as to increase a sampling rate as high as possible.

Therefore, the reception terminal determines proper combination determination information for a voice signal in consideration of background noise, audio quality, a tone of a caller, and the like of a voice signal provided from a counterpart terminal and transmits the determined combination determination information to the counterpart terminal (transmission terminal), and the counterpart terminal (transmission terminal) receives the combination determination information.

After operation S102, the transmission terminal may compress a voice signal according to the received combination determination information and transmit the compressed voice signal to the reception terminal in operation S104. For example, when receiving {(0, 0), (1, 1), (1, 2), (2, 3), (2, 4), (2, 5)} shown in FIG. 4(b) as the combination determination information, the transmission terminal may compress a voice signal to be transmitted to the reception terminal, at a sampling rate and a bit-rate corresponding to the combination determination information. That is, if it is determined that the voice signal is compressed so as to correspond to (0, 0) of the combination determination information, the transmission terminal may compress the voice signal according to a sampling rate type 8,000 (NB) corresponding to identification information "0" and a bit-rate type 7.2 corresponding to identification information "0" and transmit the compressed voice signal to the reception terminal.

Figure 6:
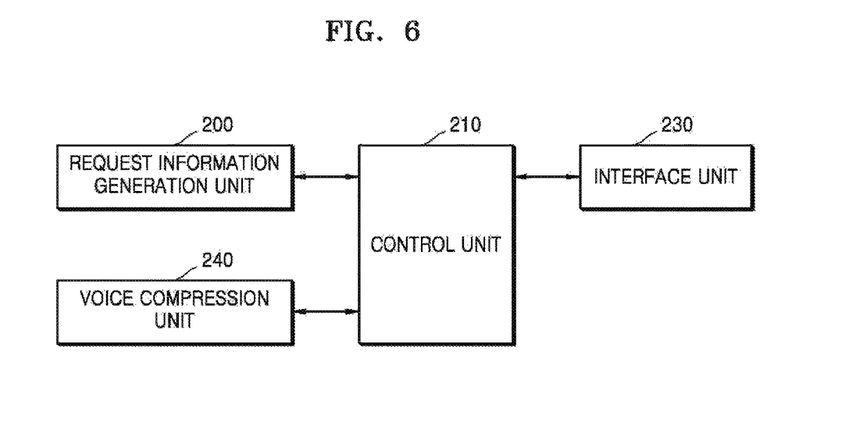
FIG. 6 is a block diagram of an operating apparatus of a transmission terminal for transmitting a voice signal, according to an exemplary embodiment.

FIG. 6 is a block diagram of an operating apparatus of a transmission terminal for transmitting a voice signal, according to an exemplary embodiment, and the apparatus may include a request information generation unit 200, a control unit 210, an interface unit 230, and a voice compression unit 240.

Referring to FIG. 6, the request information generation unit 200 may generate sampling- and bit-rate request information including sampling list information having at least one sampling type for determining a sampling rate of the voice signal and bit-rate list information having at least one bit-rate type for determining a bit-rate of the voice signal. The sampling list information included in the sampling- and bit-rate request information may include sampling identification information corresponding to respective sampling types, and the bit-rate list information may include bit-rate identification information corresponding to respective bit-rate types.

The request information generation unit 200 may insert the generated sampling- and bit-rate request information into a payload header. That is, the sampling list information and the bit-rate list information corresponding to the sampling- and bit-rate request information may be added to the payload header. The payload header includes, together with the sampling list information and the bit-rate list information, sampling type confirmation information of a sampling type being currently used, bit-rate type confirmation information of a bit-rate type being currently used, and the like.

The request information generation unit 200 may generate a VoIP packet in which at least one of an RTP header, a UDP header, and an IP header are added in addition to the payload header having the sampling- and bit-rate request information. As shown in FIG. 3, the request information generation unit 200 inserts the sampling rate list information and the bit-rate list information into the payload header and may insert sampling rate information and bit-rate information being currently used into the payload header. The request information generation unit 200 may generate a VoIP packet in which the RTP header, the UDP header, and the IP header are added in addition to an RTP payload including the payload header, an EVS frame, and padding bits.

The control unit 210 may control the sampling- and bit-rate request information including the sampling rate list information and the bit-rate list information to be transmitted to a reception terminal.

The interface unit 230 may transmit the sampling- and bit-rate request information to the reception terminal under control of the control unit 210. Thereafter, the interface unit 230 may receive, from the reception terminal, combination determination information by at least one combination of sampling types selected from the sampling list information and bit-rate types selected from the bit-rate list information.

For example, as shown in FIG. 4(*b*), {(0, 0), (1, 1), (1, 2), (2, 3), (2, 4), (2, 5)} as the combination determination information may be received from the reception terminal. Each piece of the combination determination information may indicate (sampling rate identification information, bit-rate identification information). Therefore, {(0, 0), (1, 1), (1, 2), (2, 3), (2, 4), (2, 5)} as the combination determination information respectively indicate combination information of sampling rate types and bit-rate types of 7.2 (NB), 8 (WB), 9.6 (WB), 13.2 (SWB), 16.4 (SWB), and 24.4 (SWB). This combination determination information may be determined by using at least one of background noise, voice quality, voice tone of the voice signal.

The voice compression unit 240 may compress the voice signal according to the received combination determination information. For example, when receiving {(0, 0), (1, 1), (1, 2), (2, 3), (2, 4), (2, 5)} shown in FIG. 4(*b*) as the combination determination information, the voice compression unit 240 may compress a voice signal to be transmitted to the reception terminal, at a sampling rate and a bit-rate corresponding to the combination determination information. That is, if it is determined that the voice signal is compressed so as to correspond to (0, 0) of the combination determination information, the voice compression unit 240 may compress the voice signal according to a sampling rate type 8,000 (NB) corresponding to identification information "0" and a bit-rate type 7.2 corresponding to identification information "0" and output the compressed voice signal to the interface unit 230.

The voice compression unit 240 may transmit the compressed voice signal to the reception terminal under control of the control unit 210.

Figure 7:
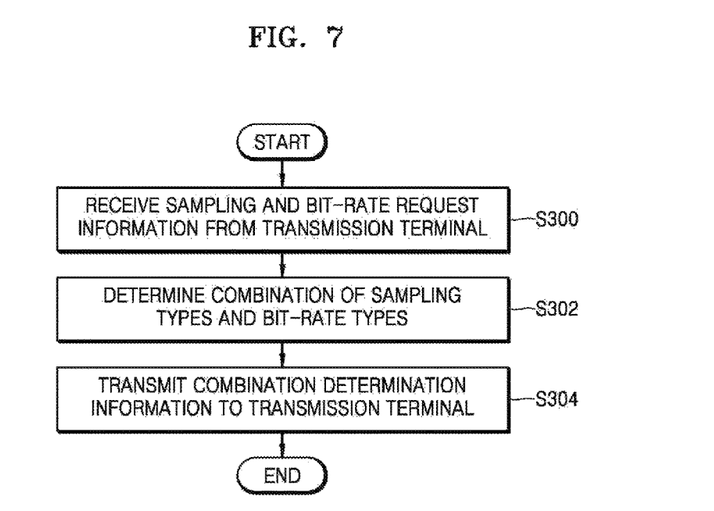
FIG. 7 is a flowchart of an operating method of a reception terminal for receiving a voice signal, according to an exemplary embodiment.

FIG. 7 is a flowchart of an operating method of a reception terminal for receiving a voice signal, according to an exemplary embodiment.

Referring to FIG. 7, in operation S300, the reception terminal may receive, from a transmission terminal, sampling- and bit-rate request information including sampling information for determining a sampling rate of a voice signal and bit-rate information for determining a bit-rate of the voice signal. The sampling information may include sampling list information having at least one sampling type or sampling rate range information determined to a specific range, and the bit-rate information may include bit-rate list information having at least one bit-rate type or bit-rate range information determined to a specific range. The sampling list information may include sampling identification information corresponding to respective sampling types, and the bit-rate list information may include bit-rate identification information corresponding to respective bit-rate types.

The sampling- and bit-rate request information may be received by being inserted into a payload header. That is, the sampling list information and the bit-rate list information corresponding to the sampling- and bit-rate request information may be added to the payload header, and the payload header includes, together with the sampling list information and the bit-rate list information, sampling type confirmation information of a sampling type being currently used, bit-rate type confirmation information of a bit-rate type being currently used, and the like.

The payload header having the sampling- and bit-rate request information may be received in a form of a VoIP packet in which at least one of an RTP header, a UDP header, and an IP header are added. As shown in FIG. 3, the reception terminal may receive a VoIP packet in which the RTP header, the UDP header, and the IP header are added in addition to an RTP payload including the payload header, an EVS frame, and padding bits.

After operation S300, the reception terminal may determine at least one combination of sampling rates determined based on the sampling information and bit-rates determined based on the bit-rate information in operation S302. Combination determination information may be determined by at least one combination of sampling types selected from the sampling information and bit-rate types selected from the bit-rate information or by at least one combination of a range of sampling rates determined within the range of the sampling rate range information and a range of bit-rates determined within the range of the bit-rate range information. The sampling rate range information may be differently determined in a sending direction and a receiving direction, and the bit-rate range information may be differently determined in the sending direction and the receiving direction.

The reception terminal may separate the payload header, the RTP header, the UDP header, and the IP header from the received VoIP packet, extract the sampling list information and the bit-rate list information from the separated payload header, and determine the at least one combination by using the extracted sampling list information and bit-rate list information.

As shown in FIG. 4(*b*), the reception terminal may select EVS from the sampling rate list information and determine any one sampling rate (for example, 32,000 samples/s). In addition, the reception terminal may determine that a bit-rate of maximum 24.4 Kbps from the bit-rate list information is used. That is, config-set may be determined to be {(0, 0), (1, 1), (1, 2), (2, 3), (2, 4), (2, 5)} as the combination determination information. Each piece of the combination determination information may indicate (sampling rate identification information, bit-rate identification information). That is, (0, 0) is a combination of sampling rate identification information "0" and bit-rate identification information "0", wherein a sampling rate type corresponding to the identification information corresponds to 8,000 (NB), and a bit-rate type corresponding to the identification information corresponds to 7.2. Therefore, {(0, 0), (1, 1), (1, 2), (2, 3), (2, 4), (2, 5)} as the combination determination information respectively indicate combination information of sampling rate types and bit-rate types of 7.2 (NB), 8 (WB), 9.6 (WB), 13.2 (SWB), 16.4 (SWB), and 24.4 (SWB).

The reception terminal may determine combination information of sampling rate types and bit-rate types by using at least one of background noise, audio quality, audio tone of an audio signal including the voice signal.

As shown in FIG. 5, the reception terminal may not want to hear high-frequency audio or a sharp sound. In this case, the reception terminal analyzes received voice frames and determines combination determination information by including a sampling rate which is to be decreased from the SWB to the WB or NB when an energy ratio of high-frequency components of a specific frequency or higher is a specific level or higher as shown in FIG. 5(b) and by matching bit-rate types which can be combined with the sampling rate. On the contrary, in a situation of being connected to a security camera or the like such that it is necessary to transmit even a change in a fine sound, the reception terminal may determine combination determination information by adjusting a sampling rate of the NB to the WB, the SWB, or the like to increase the sampling rate as high as possible and matching bit-rate types which can be combined with the sampling rate.

After operation S302, the reception terminal may transmit the determined combination determination information to the transmission terminal in operation S304. Thereafter, when the transmission terminal transmits a voice signal compressed according to the combination determination information, the reception terminal may receive the compressed voice signal and restore and output a voice signal.

Figure 8:
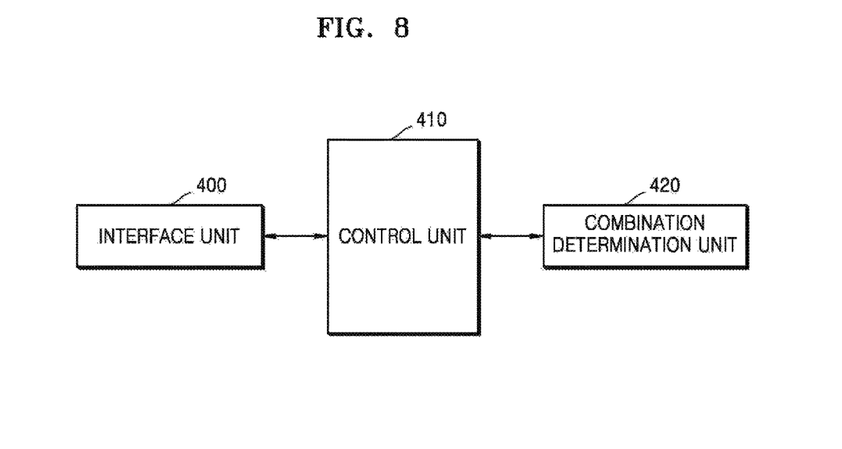
FIG. 8 is a block diagram of an operating apparatus of a reception terminal for receiving a voice signal, according to an exemplary embodiment.

FIG. 8 is a block diagram of an operating apparatus of a reception terminal for receiving a voice signal, according to an exemplary embodiment, and the apparatus may include an interface unit 400, a control unit 410, and a combination determination unit 420.

Referring to FIG. 8, the interface unit 400 may receive, from a transmission terminal, sampling- and bit-rate request information including sampling list information having at least one sampling type for determining a sampling rate of a voice signal and bit-rate list information having at least one bit-rate type for determining a bit-rate of the voice signal. The interface unit 400 may receive a payload header into which the sampling- and bit-rate request information is inserted. The interface unit 400 may receive a payload header including, together with the sampling list information and the bit-rate list information, sampling type confirmation information of a sampling type being currently used, bit-rate type confirmation information of a bit-rate type being currently used, and the like.

The payload header may be received in a form of a VoIP packet in which at least one of an RTP header, a UDP header, and an IP header are added. As shown in FIG. 3, the interface unit 400 may receive a VoIP packet in which the RTP header, the UDP header, and the IP header are added in addition to an RTP payload including the payload header, an EVS frame, and padding bits.

The control unit 410 may control the combination determination unit 420 to determine a combination of a sampling rate type and a bit rate type, according to the reception of the sampling- and bit-rate request information.

The combination determination unit 420 may determine at least one combination of sampling types determined from the sampling list information and bit-rate types determined from the bit-rate list information, according to the sampling- and bit-rate request information.

The combination determination unit 420 may separate the payload header, the RTP header, the UDP header, and the IP header from the received VoIP packet, extract the sampling list information and the bit-rate list information from the separated payload header, and determine the at least one combination by using the extracted sampling list information and bit-rate list information.

As shown in FIG. 4(b), the combination determination unit 420 may select EVS from the sampling rate list information and determine any one sampling rate (for example, 32,000 samples/s). In addition, the combination determination unit 420 may determine that a bit-rate of maximum 24.4 Kbps from the bit-rate list information is used. Each piece of the combination determination information may indicate (sampling rate identification information, bit-rate identification information). {(0, 0), (1, 1), (1, 2), (2, 3), (2, 4), (2, 5)} as the combination determination information respectively indicate combination information of sampling rate types and bit-rate types of 7.2 (NB), 8 (WB), 9.6 (WB), 13.2 (SWB), 16.4 (SWB), and 24.4 (SWB).

The combination determination unit 420 may determine at least one combination of sampling rate types and bit-rate types by using at least one of background noise, audio quality, audio tone of an audio signal including the voice signal.

As shown in FIG. 5, a user of the reception terminal may not want to hear high-frequency audio or a sharp sound. In this case, the reception terminal may analyze received voice frames and determines combination determination information by including a sampling rate which is to be decreased from the SWB to the WB or NB when an energy ratio of high-frequency components of a specific frequency or higher is a specific level or higher as shown in FIG. 5(b) and by matching bit-rate types which can be combined with the sampling rate. On the contrary, in a situation of being connected to a security camera or the like such that it is necessary to transmit even a change in a fine sound, the reception terminal may determine combination determination information by adjusting a sampling rate of the NB to the WB, the SWB, or the like to increase the sampling rate as high as possible and matching bit-rate types which can be combined with the sampling rate.

The control unit 410 may control the determined combination determination information to be transmitted to the transmission terminal. According to this, the interface unit 400 may transmit the combination determination information to the transmission terminal.

Such a negotiation method between a transmission terminal and a reception terminal provides maximum flexibility to the transmission terminal in the selection of a bit rate and a sampling rate to be used for a call but has several important restrictions.

First, bit rates used for a call service are influenced by a fare system and are usually assigned to a set of adjacent bit rates such as 13.2, 16.4, and 24.4 Kbps rather than separated to, for example, 7.2, 24.4, and 48 Kbps. That is, bit rates may be assigned in a specific range unit, and a bit rate may be adjusted within this range and used according to a transmission condition. In this situation, rather than negotiating individual bit rates one by one, it may be efficient that a range of a minimum bit rate and a maximum bit rate to be used for a call is negotiated.

Figure 9:
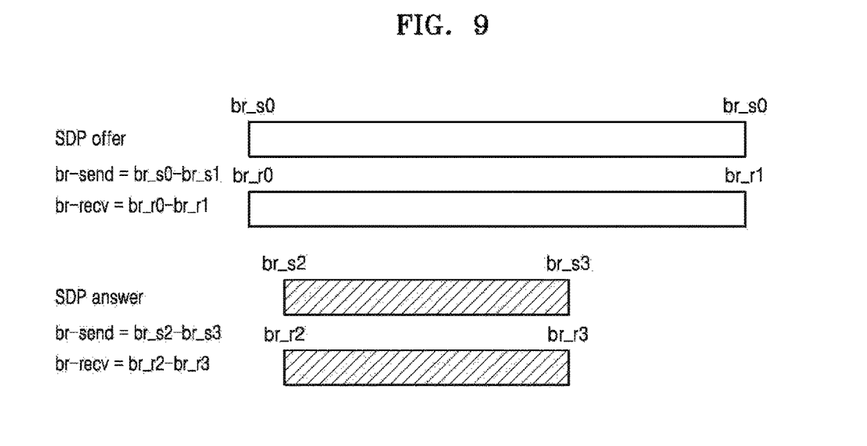
FIG. 9 is an illustrative reference diagram for describing two terminals negotiating a bit-rate to be used for a call in a range unit.

FIG. 9 shows a process in which a transmission terminal offers, to a reception terminal, bit rates to be respectively used in sending and receiving directions, by using br-send and br-recv messages, and the reception terminal selects a partial range from among the offered bit rates and answers the selected range.

Herein, the br-send and br-recv messages indicate mutually opposite directions in view of the transmission terminal and the reception terminal. In order for a call negotiation to gradually converge according to message exchanges, a bit-rate range of a br-send message transmitted by the reception terminal should be a subset of a bit-rate range offered in a br-recv message transmitted by the transmission terminal. In addition, a bit-rate range of a br-recv message transmitted by the reception terminal should be a subset of a bit-rate range offered in a br-send message transmitted by the transmission terminal.

Another restriction of the basic negotiation method is a problem that, when a sampling rate has been negotiated but a transmission terminal needs to adjust the sampling rate due to an unpredicted characteristic of an input signal or background noise, the adjustment should be renegotiated by exchanging messages with a counterpart terminal. If a characteristic of an input signal or background noise is changed at a high speed, even when the transmission terminal continuously tries renegotiation, the transmission terminal may not meet a characteristic of a currently inputted signal. Even in this case, it may be efficient that a range of a minimum sampling rate and a maximum sampling rate to be used for a call is negotiated at once in a call negotiation step.

Figure 10:
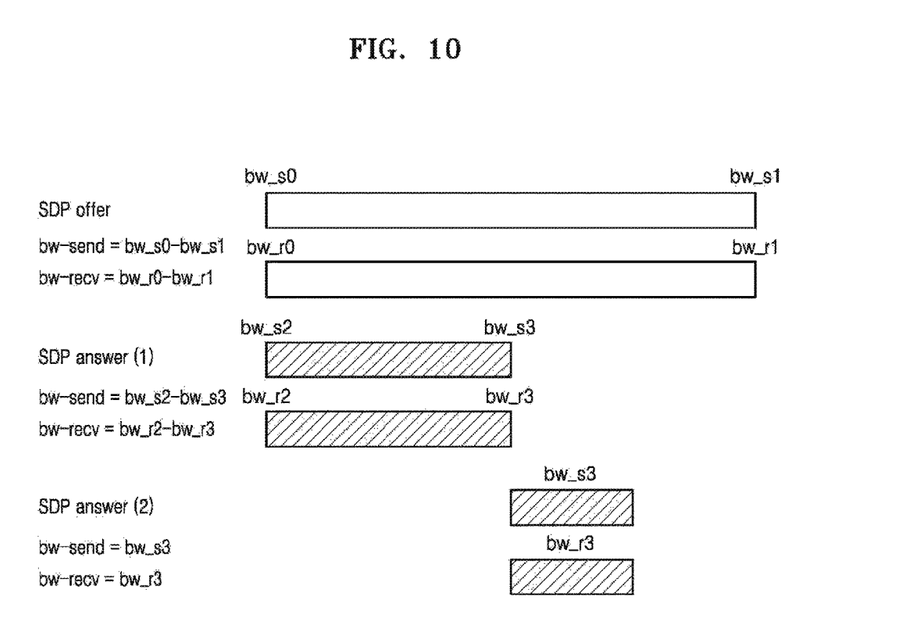
FIG. 10 is an illustrative reference diagram for describing two terminals negotiating a sampling rate to be used for a call in a range unit.

FIG. 10 shows a process in which a transmission terminal offers, to a reception terminal, a range of sampling rates to be respectively used in sending and receiving directions, by using bw-send and bw-recv messages, and the reception terminal selects a partial range from among the offered sampling rates and answers the selected range. Herein, the bw-send and bw-recv messages indicate mutually opposite directions in view of the transmission terminal and the reception terminal. In order for a call negotiation to converge, a sampling rate range of a bw-send message transmitted by the reception terminal should be a subset of a sampling rate range offered in a bw-recv message transmitted by the transmission terminal. In addition, a sampling rate range of a bw-recv message transmitted by the reception terminal should be a subset of a sampling rate range offered in a bw-send message transmitted by the transmission terminal. As described above, the method of negotiating bit rates and sampling rates in a range unit may be less flexible than the method of negotiating individual bit rates and individual sampling rates but has advantages of meeting a realistic service situation and simplifying messages to be exchanged. In addition, since both directions are separately negotiated, even when audio processing capacities of transmission and reception terminals differ from each other, the method of negotiating bit rates and sampling rates in a range unit may more efficiently deal with this situation than the method of negotiating individual bit rates and individual sampling rates. When the same bit rate or sampling rate is used for both directions, messages indicated with reduced symbols such as br and bw instead of br-send/br-recv and bw-send/bw-recv.

Table 5 includes the definition of these messages. bw, bw-send and bw-recv may be used for negotiation of individual sampling rates such as an NB, a WB, an SWB, and an FB besides sampling rates in a range unit.

TABLE 5

| Message | Definition |
| --- | --- |
| br | Specifies the range of codec bit-rate to be used in the session, in kilobits per second, for the sending and the receiving directions. The parameter can either have: a single bit-rate (br1); or a hyphen-separated pair of two bit-rates (br1-br2). If a single value is included, this bit-rate, br1, is used. If a hyphen-separated pair of two bit-rates is included, br1 and br2 are used as the minimum bit-rate and the maximum bit-rate respectively. br1 shall be smaller than br2. br1 and br2 have a value from the set: 5.9, 7.2, 8, 9.6, 13.2, 16.4, 24.4, 32, 48, 64, 96, and 128. 5.9 represents the average bit-rate of source controlled variable bit rate (SC-VBR) coding, and 7.2, . . . , 128 represent the bit-rates of constant bit-rate source coding. When the same bit-rate or bit-rate range is defined for the sending and the receiving directions, br should be used but br-send and br-recv may also be used. br can be used even if the session is negotiated to be sendonly, recvonly or inactive. For sendonly sessions, br and br-send can be interchangeable used. For recvonly sessions, br and br-recv can be interchangeably used. At least a bandwidth each negotiated bit-rate supports shall be included in the negotiated bandwidth(s). If not present, all bit-rates supporting the negotiated bandwidth(s) are allowed in the session. When br is not offered for a payload type, the answerer may include br for the payload type in the SDP answer. When br is offered for a payload type and this payload type is accepted, the answerer shall include br in the SDP answer, and the br shall be a subset of br for the payload type in the SDP offer. |
| br-send | Specifies the range of codec bit-rate to be used in the session, in kilobits per second, for the sending direction. The parameter can either have: a single bit-rate (br1); or a hyphen-separated pair of two bit-rates (br1-br2). If a single value is included, this bit-rate, br1, is used. If a hyphen-separated pair of two bit-rates is included, br1 and br2 are used as the minimum bit-rate and the maximum bit-rate respectively. br1 shall be smaller than br2. br1 and br2 have a value from the set: 5.9, 7.2, 8, 9.6, 13.2, 16.4, 24.4, 32, 48, 64, 96, and 128. 5.9 represents the average bit-rate of source controlled variable bit-rate (SC-VBR) coding, and 7.2, . . . , 128 represent the bit-rates of constant bit-rate source coding. At least a bandwidth each negotiated bit-rate supports shall be included in the negotiated bandwidth(s). If not present, all bit-rates supporting the negotiated bandwidth(s) are allowed in the session. When br-send is not offered for a payload type, the answerer may include br-recv for the payload type in the SDP answer. When br-send is offered for a payload type and this payload type is accepted, the answerer shall include br-recv in the SDP answer, and the br-recv shall be a subset of br-send for the payload type in the SDP offer. |
| br-recv | Specifies the range of codec bit-rate to be used in the session, in kilobits per second, for the receiving direction. The parameter can either have: a single bit-rate (br1); or a hyphen-separated pair of two bit-rates (br1-br2). If a single value is included, this bit-rate, br1, is used. If a hyphen-separated pair of two bit-rates is included, br1 and br2 are used as the minimum bit-rate and the maximum bit-rate respectively. br1 shall be smaller than br2. br1 and br2 have a value from the set: 5.9, 7.2, 8, 9.6, 13.2, 16.4, 24.4, 32, 48, 64, 96, and 128. 5.9 represents the average bit-rate of source controlled variable bit-rate (SC-VBR) coding, and 7.2, . . . , 128 represent the bit-rates of constant bit-rate source coding. At least a bandwidth each negotiated bit-rate supports shall be included in the negotiated bandwidth(s). If not present, all bit-rates supporting the negotiated bandwidth(s) are allowed in the session. When br-recv is not offered for a payload type, the answerer may include br-send for the payload type in the SDP answer. When br-recv is offered for a payload type and this payload type is accepted, the answerer shall include br-send in the SDP answer, and the br-send shall be a subset of br-recv for the payload type in the SDP offer. |
| bw | Specifies the bandwidth to be used in the session for the sending and the receiving directions. bw has a value from the set: nb, wb, swb, fb, nb-wb, nb-swb, and nb-fb. nb, wb, swb, and fb represent narrowband, wideband, super-wideband, and fullband respectively, and nb-wb, nb-swb, and nb-fb represent all bandwidths from narrowband to wideband, super-wideband, and fullband respectively. When the same bandwidth or bandwidth range is |

TABLE 5-continued

| Message | Definition |
|---|---|
| | defined for the sending and the receiving directions, bw should be used but bw-send and bw-recv may also be used. bw can be used even if the session is negotiated to be sendonly, recvonly or inactive. For sendonly session, bw and bw-send can be interchangeably used. For recvonly sessions, bw and bw-recv can be interchangeably used. If not present, all bandwidths the negotiated bit-rate(s) support are allowed in the session. When bw is not offered for a payload type, the answerer may include bw for the payload type in the SDP answer. When bw is offered for a payload type and this payload type is accepted, the answerer shall include bw in the SDP answer, and the bw shall be a subset of bw for the payload type in the SDP offer.) |
| bw-send | Specifies the bandwidth to be used in the session for the sending direction. bw-send has a value from the set: nb, wb, swb, fb, nb-wb, nb-swb, and nb-fb. nb, wb, swb, and fb represent narrowband, wideband, super-wideband, and fullband respectively, and nb-wb, nb-swb, and nb-fb represent all bandwidths from narrowband to wideband, super-wideband, and fullband respectively. At least a negotiated bit-rate shall support each negotiated bandwidth. If not present, all bandwidths the negotiated bit-rate(s) support are allowed in the session. When bw-send is not offered for a payload type, the answerer may include bw-recv for the payload type in the SDP answer. When bw-send is offered for a payload type and this payload is accepted, the answerer shall include bw-recv in the SDP answer, and the bw-recv shall be a subset of bw-send for the payload type in the SDP offer. |
| bw-recv | Specifies the bandwidth to be used in the session for the receiving direction. bw-recv has a value from the set: nb, wb, swb, fb, nb-wb, nb-swb, and nb-fb. nb, wb, swb, and fb represent narrowband, wideband, super-wideband, and fullband respectively, and nb-wb, nb-swb, and nb-fb represent all bandwidths from narrowband to wideband, super-wideband, and fullband respectively. At least a negotiated bit-rate shall support each negotiated bandwidth. If not present, all bandwidths the negotiated bit-rate(s) support are allowed in the session. When bw-recv is not offered for a payload type, the answerer may include bw-send for the payload type in the SDP answer. When bw-recv is offered for a payload type and this payload is accepted, the answerer shall include bw-send in the SDP answer, and the bw-send shall be a subset of bw-recv for the payload type in the SDP offer. |

Figure 11:
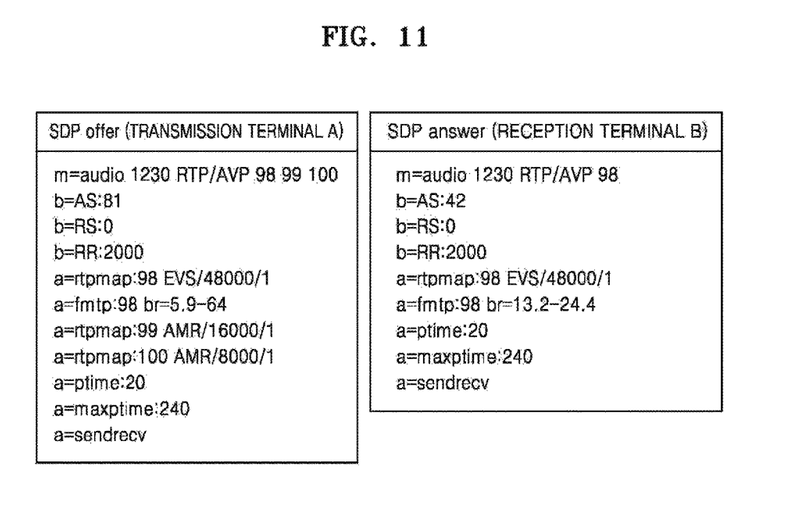
FIG. 11 is a reference diagram showing an example of information transmitted from a transmission terminal to a reception terminal and information transmitted from the reception terminal to the transmission terminal between the two terminals which negotiate a bit-rate in a range unit.

In FIG. 11, a transmission terminal offers, to a reception terminal, that an EVS codec uses a bit-rate in a range of 5.9 to 64 Kbps, and the reception terminal adjusts upper and lower limits of the range, modifies the range such that a bit-rate in a range of 13.2 to 24.4 Kbps is used for a call, and answers the modified range back to the transmission terminal.

Figure 12:
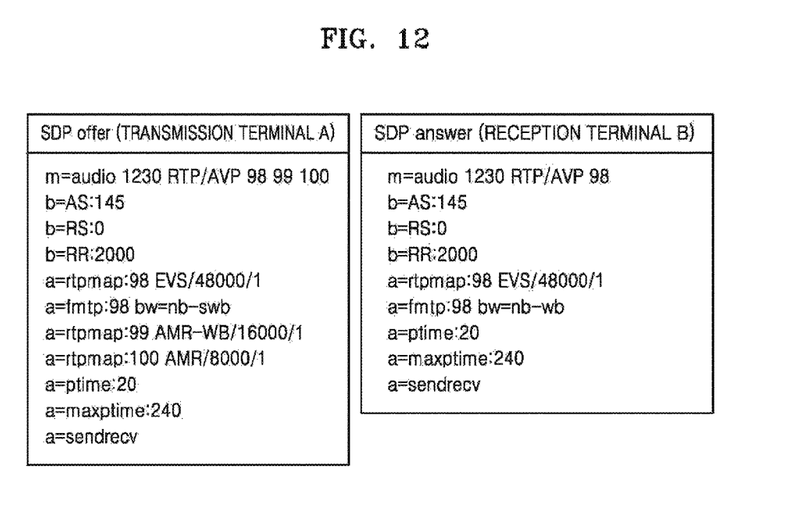
FIG. 12 is a reference diagram showing an example of information transmitted from a transmission terminal to a reception terminal and information transmitted from the reception terminal to the transmission terminal between the two terminals which negotiate a sampling rate in a range unit.

In FIG. 12, a transmission terminal offers, to a reception terminal, that an EVS codec uses a sampling rate in a range of the NB to the SWB, and the reception terminal adjusts upper and lower limits of the range, modifies the range such that a sampling rate in a range of the NB to the WB is used, and answers the modified range back to the transmission terminal.

Figure 13:
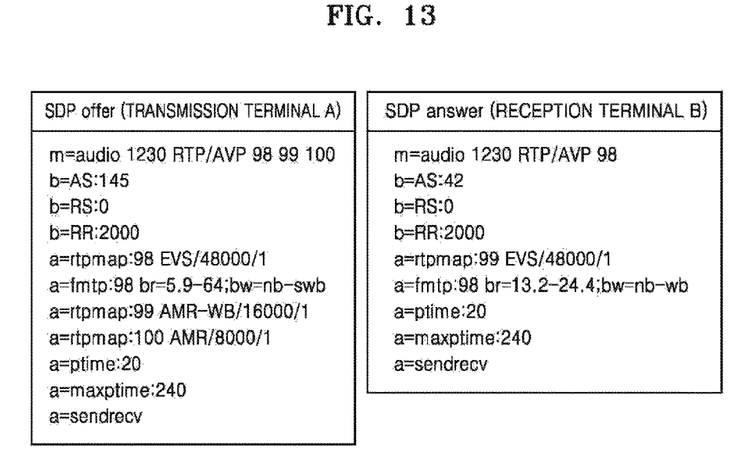
FIG. 13 is a reference diagram showing an example of information transmitted from a transmission terminal to a reception terminal and information transmitted from the reception terminal to the transmission terminal between the two terminals which negotiate a bit-rate and a sampling rate in a range unit.

In FIG. 13, a transmission terminal offers, to a reception terminal, that an EVS codec uses a bit-rate in a range of 5.9 to 64 Kbps and a sampling rate in a range of the NB to the SWB, and the reception terminal adjusts upper and lower limits of the bit-rate range and an upper limit of the sampling rate range, modifies the ranges such that a bit-rate in a range of 13.2 to 24.4 Kbps and a sampling rate in a range of the NB to the WB are used, and answers the modified ranges back to the transmission terminal.

Figure 14:
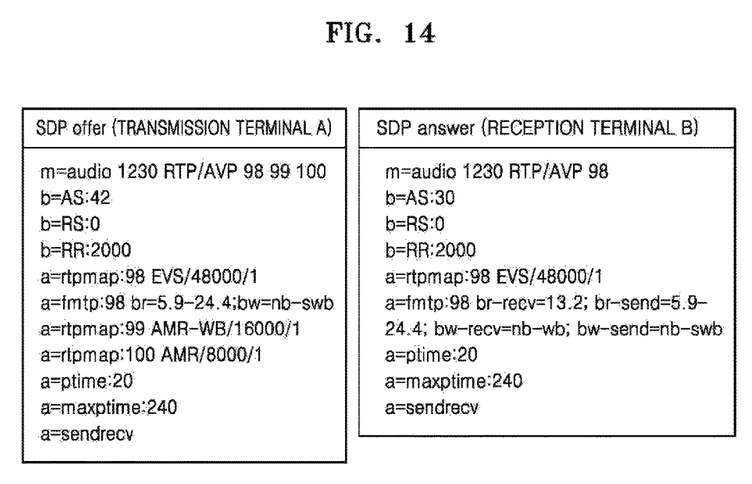
FIG. 14 is a reference diagram showing an example of information transmitted from a transmission terminal to a reception terminal and information transmitted from the reception terminal to the transmission terminal between the two terminals which negotiate a bit-rate and a sampling rate in a range unit.

In FIG. 14, a transmission terminal offers, to a reception terminal, that an EVS codec uses a bit-rate in a range of 5.9 to 24.4 Kbps and a sampling rate in a range of the NB to the SWB, and the transmission terminal modifies the ranges such that a bit-rate of 13.2 Kbps and a sampling rate in a range of the NB to the WB are used in a receiving direction and a bit-rate in the range of 5.9 to 24.4 Kbps and a sampling rate in the range of the NB to the SWB are used as requested in a sending direction, and answers the modified ranges back to the transmission terminal.

The methods according to exemplary embodiments may be implemented as hardware or software or as a combination of hardware and software. When the methods are implemented as software, a computer-readable storage medium for storing one or more programs (software modules) may be provided. The one or more programs stored in the computer-readable storage medium are configured for execution by one or more processors in an electronic device. The one or more programs include instructions of commanding the electronic device to execute the methods according to embodiments.

These programs (software modules or software) may be stored in a nonvolatile memory including random access memory (RAM) and flash memory, read-only memory (ROM), electrically erasable programmable ROM (EEPROM), a magnetic disc storage device, compact disc-ROM (CD-ROM), a digital versatile disc (DVD), another type of optical storage device, or a magnetic cassette. Alternatively, the programs may be stored in a memory including some or all thereof. In addition, each of the memories described above may be plural in number.

Alternatively, the programs may be stored in an attachable storage device which can access the electronic device through a communication network including the Internet, an intranet, a local area network (LAN), a wide LAN (WLAN), and a storage area network (SAN), taken alone or in combination. This storage device may access the electronic device through an external port. Alternatively, a separate storage device on the communication network may access a portable electronic device.

The invention claimed is:

1. An operating method of a transmission terminal for transmitting an audio signal, the method comprising:
generating bandwidth information indicating a first bandwidth range, and bit rate information indicating a first bit rate range;
transmitting the bandwidth information indicating a first bandwidth range and the bit rate information indicating a first bit rate range to a reception terminal;
receiving combination determination information from the reception terminal;
compressing the audio signal according to the received combination determination information; and
transmitting the compressed audio signal to the reception terminal,
wherein the combination determination information is determined based on bandwidth information indicating a second bandwidth range, and bit rate information indicating a second bit rate range, by the reception terminal, and
wherein the second bandwidth range is comprised in the first bandwidth range, and the second bit rate range is comprised in the first bit rate range.

2. The method of claim 1, wherein the first bandwidth range and the first bit rate range are determined differently in each of a sending direction and a receiving direction.

3. The method of claim 1, wherein the combination determination information is adjusted during a call by the reception terminal and the combination determination information is received during a call by the transmission terminal.

4. The method of claim 1, wherein the combination determination information is determined by using at least one of background noise, audio quality, and audio tone of the audio signal.

5. An operating method of a reception terminal for receiving an audio signal, the method comprising:
receiving, from a transmission terminal, bandwidth information indicating a first bandwidth range, and bit rate information indicating a first bit rate range;
determining combination determination information based on bandwidth information indicating a second bandwidth range, and bit rate information indicating a second bit rate range, by the reception terminal; and
transmitting the combination determination information to the transmission terminal,
wherein the second bandwidth range is comprised in the first bandwidth range, and the second bit rate range is comprised in the first bit rate range.

6. The method of claim 5, wherein the second bandwidth range and the second bit rate range are determined differently in each of a sending direction and a receiving direction.

7. The method of claim 5, wherein the combination determination information is adjusted during a call by the reception terminal and the combination determination information is received during a call by the transmission terminal.

8. The method of claim 5, wherein the combination determination information is determined by using at least one of background noise, audio quality, and audio tone of the audio signal.

9. The method of claim 2, wherein when the first bandwidth range for the sending direction and the first bandwidth range for the receiving direction are different each other, the bandwidth information indicating the first bandwidth range for the sending direction and the bandwidth information indicating the first bandwidth range for the receiving direction are transmitted to the reception terminal through different messages, and
when the first bit rate range for the sending direction and the first bit rate range for the receiving direction are different each other, the bit rate information indicating the first bit rate range for the sending direction and the bit rate information indicating the first bit rate range for the receiving direction are transmitted to the reception terminal through different messages.

10. The method of claim 9, wherein when the first bandwidth range for the sending direction and the first bandwidth range for the receiving direction are the same, the bandwidth information indicating the first bandwidth range for the sending direction and the bandwidth information indicating the first bandwidth range for the receiving direction are transmitted to the reception terminal through a single message, and
when the first bit rate range for the sending direction and the first bit rate range for the receiving direction are the same, the bit rate information indicating the first bit rate range for the sending direction and the bit rate information indicating the first bit rate range for the receiving direction are transmitted to the reception terminal through a single message.

* * * * *